United States Patent [19]

Varady et al.

[11] Patent Number: 5,030,352

[45] Date of Patent: Jul. 9, 1991

[54] COATED MEDIA FOR CHROMATOGRAPHY

[75] Inventors: Laszlo Varady, Malden, Mass.; Yan B. Yang, West Lafayette, Ind.; Steven E. Cook, Wilmington, Del.; Fred E. Regnier, West Lafayette, Ind.

[73] Assignee: Purdue Research Foundation, West Lafeyette, Ind.

[21] Appl. No.: 469,956

[22] Filed: Jan. 25, 1990

[51] Int. Cl.$^5$ .............................................. B01D 15/08
[52] U.S. Cl. ................... 210/502.1; 55/386; 210/198.2; 427/220; 428/406; 428/422
[58] Field of Search ............... 55/386; 210/656, 198.2, 210/198.3, 502.1; 428/406, 422, 458, 473.5; 525/54.1; 427/220, 301

[56] References Cited

U.S. PATENT DOCUMENTS

| | | | |
|---|---|---|---|
| 4,886,598 | 12/1989 | Barkey | 210/502.1 X |
| 4,927,879 | 5/1990 | Pidgeon | 210/656 X |
| 4,931,498 | 6/1990 | Pidgeon | 210/656 X |

*Primary Examiner*—Robert Spitzer
*Attorney, Agent, or Firm*—Testa, Hurwitz & Thibeault

[57] ABSTRACT

Disclosed are pellicular materials useful in contact with proteins and as chromatography media. Rigid, inert, hydrophobic, polymeric materials are exposed to a solution comprising a solute defining plural interspersed hydrophobic and hydrophilic domains. The solute molecules adsorb onto the surface of the substrate by hydrophobic - hydrophobic interaction with their hydrophilic domains extending outwardly away from the surface into the solution. The molecules are then crosslinked in place to produce a solvent and pH resistant coating which presents a hydrophilic surface sufficient to mask hydrophobic regions therebeneath. The multidomain adsorbing compounds may comprise reactive groups which subsequently can be derivatized using conventional techniques to produce chromatography materials useful for conducting affinity, size exclusion, cationic exchange, anionic exchange, neutral hydrophobic interaction, and other forms of chromatographic separations.

26 Claims, 10 Drawing Sheets

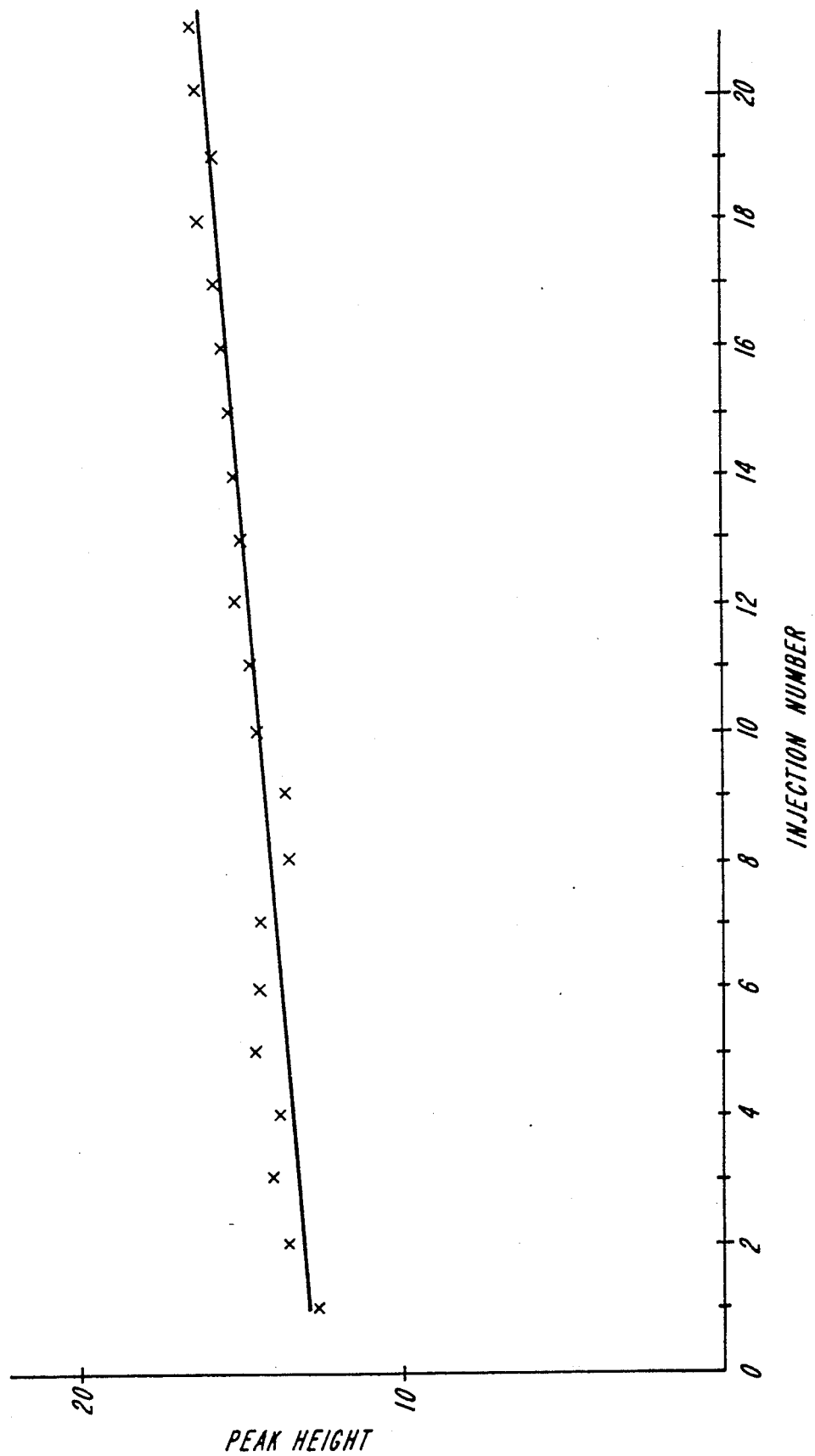

COATED MEDIA FOR CHROMATOGRAPHY

National Institute of Health Grant No. 25431 supported in part the development of the invention disclosed herein, and the U.S. government therefore has certain rights in the application.

FIELD OF THE INVENTION

This invention relates to the production of hydrophilic coatings on hydrophobic surfaces. Specifically, this invention relates to hydrophobic materials having a hydrophilic, derivatizable surface coating useful as a chromatography medium for protein separation and as a protein compatible surface.

BACKGROUND OF THE INVENTION

Support materials for high productivity liquid chromatography must be chemically and mechanically stable. Rigid inert polymers such as crosslinked polystyrene permit increases in operating pressure and flow rates. Unfortunately, hydrophobic interactions between such resins and proteins often are so strong that the proteins are denatured upon adsorption or during elution. Thus, it is recognized that one must post treat the hydrophobic surface of such polymeric chromatography-packing materials to adapt it for use in the separation of proteins.

It is often necessary to force liquid through chromatographic column beds because the liquid mobile phase flows too slowly under the force of gravity to produce acceptable separation times. The problem of flow rate is aggravated by the use of microparticulate packing geometries often used to enhance resolution. It is common in liquid chromatography, i.e., high pressure liquid chromatography or HPLC, to use pressures of 100 atmospheres or more to achieve rapid separations. Soft-gel packing materials will not tolerate more than a few atmospheres of pressure, thus are unsuited for high pressure use, and increasingly are being replaced with rigid materials.

It is at least theoretically possible to react hydrophilic moieties with sites on hydrophobic polymers to provide a hydrophilic surface character. Such post coated materials, often referred to as pellicular materials or supports, can be produced readily if the base polymer is one having many easily derivatized reactive groups. One example of this approach involves alkylation of styrene, followed by polymerization to produce derivatized polystyrene, and subsequent surface reaction with polyoxyethylene.

Another example is the derivatization of polymethacrylate. The basic hydrophobic character of this polymer may be altered if very hydrophilic groups are introduced into the surface through esterification. Such hydrophilic groups typically comprise hydroxyl and/or ether groups, and include such materials as glycerol, ethylene glycol, diethylamino ethanol, trimethyl ethanolamino glycolic acid, and hydroxyethylsulfonic acid. Unfortunately, exposure of such materials to extremes of pH, often required for regeneration of a chromatography medium, has the effect of hydrolyzing the ester linkages and of degrading the properties of the medium.

Where the surface of rigid, inert, hydrophobic material has groups reactive enough to permit such derivatization, that property generally is inconsistent with a major reason for turning to such support materials in the first place, i.e., inertness. However, the art has developed strageties to provide coatings on truly inert polymeric particles without requiring formation of covalent bonds directly between the coating and the support.

An example of alteration of the surface characteristics of a hydrophobic support medium involves adsorbing a water soluble surfactant onto a silica-based reverse-phase packing material. (see Chang et al, J. Chrom, V. 319, pp. 396-399, 1985). The surfactants have long hydrophobic tails and bulky hydrophilic heads. Once the tails are adsorbed to the support, the hydrophilic heads cover the hydrophobic surface so a protein cannot bind. Small molecules can penetrate into the hydrophobic region, and the adsorbed coating is stable only in polar solvents. Further, the surfactants can leach from the sorbent surface, and very hydrophobic proteins can displace surfactant molecules, thereby degrading the support.

U.S. Pat. No. 4,245,005 describes an elegant method for producing a pellicular polyethyleneimine-coated, porous support. Charged polymeric molecules are attracted to the surface of support materials of opposite charge by means of electrostatic forces. Once adsorbed, the polymeric materials are cross-linked in place and therefore resist erosion by solvent extraction, changes in pH, or exposure to elution buffers. This technique works well for the production of cationic resins (exchange anions) but is impractical for the preparation of organic, chromatographic packing materials useful in other types of chromatography procedures.

SUMMARY OF THE INVENTION

This invention provides a technique for preparing derivatizable chromatographic supports and protein compatible surfaces from hydrophobic polymers. The technique involves adsorption of a molecular layer on a hydrophobic surface followed by cross-linking to produce an adherent hydrophilic surface. This is accomplished by contacting the hydrophobic surface with a relatively polar liquid, hydrophilic with respect to the surface, containing a solvated compound comprising both hydrophobic and hydrophilic domains linked flexibly by covalent bonds. The hydrophobic domains of the compound bind to the hydrophobic surface by conventional hydrophobic-hydrophobic interaction; the hydrophilic domains extend outwardly from the surface into the relatively polar liquid phase. This produces an adsorbed coating on the hydrophobic surface which presents an outer carpet of hydrophilic groups superposed above buried hydrophobic regions. Adjacent molecules in the adsorbed coating are then cross-linked in place to produce a continuous hydrophilic film enveloping the hydrophobic surface.

The adsorbed compound may contain hydroxyl, epoxy, halide, or other reactive side groups. The method may include the additional step of derivatizing the continuous, hydrophilic film at these side groups to produce anionic, cationic, reverse phase, size exclusion, affinity, or other types of chromatography media.

The liquid used to deposit the adsorbed phase preferably is formulated to control its lipophilic/hydrophilic character such that the coating compound is sparingly soluble therein. This encourages the hydrophobic domains of the solute to interact with the hydrophobic surface and the solute to accumulate at the solid/liquid interface with the hydrophilic domains extending away from the hydrophobic surface.

The cross-linking step may be accomplished by reacting a cross-linking agent with reactive groups comprising the hydrophilic domains, the hydrophobic domains, or both, or by introducing a catalyst which promotes reaction directly between adjacent reactive groups. The adsorbing compound may be an oligomer, a polymer such as a copolymer, e.g., a block copolymer, a terpolymer, or a multidomain polymerizable compound which is polymerized as well as cross-linked in place on the surface.

The hydrophilic domains of the adsorbing species preferably comprise hydroxyl groups, epoxy groups, or ether linkages. The hydrophobic domains preferably comprise halides or hydrocarbons. The hydrophobic support material can be any hydrophobic material, organic or inorganic, but preferably is a rigid, inert synthetic organic polymeric material such as polystyrene or cross-linked polystyrene. Where the adsorbing species is a multidomain polymerizable compound, the method of the invention includes the additional step of polymerizing the compound on the surface.

The invention further provides a hydrophilic material useful in contact with protein solutions comprising a substrate having a hydrophobic surface coated with a continuous hydrophilic film attached to the surface by hydrophobic interaction and cross-linking. The surface density of the hydrophilic regions of the film preferably is sufficient to mask the hydrophobic regions and the hydrophobic surface. Additionally, the film may be derivatized to contain covalently linked moieties such as hydrocarbons of various lengths, cationic groups such as amines, imines, quaternary ammonium, phosphonium, or sulfonium salts, anionic groups such as sulfate, sulfonates, carboxyl, and phosphates, or moieties designed for attachment of binding proteins such as protein A.

It is an object of the invention to provide a stable hydrophilic layer cross-linked in place on the surface of a hydrophobic support medium which resists erosion, can be applied to essentially any hydrophobic material, is compatible with aqueous protein solutions, and is stable from at least pH-2 to pH-11. Another object is to provide improved hydrophilic chromatographic supports having high mechanical strength and chemical stability. Another object is to provide a process for adsorbing a thin layer onto a support material by hydrophobic interaction, and cross-linking the layer onto the support material to produce a hydrophilic coating.

These and other objects and features of the invention will be apparent from the following description and drawings.

BRIEF DESCRIPTION OF THE DRAWINGS

The accompanying drawings illustrate the invention and its achieved results according to the best modes so far devised for the practical application of the principles of the invention.

FIG. 3 is a graph of peak height vs. injection number where the sample is lysozyme loaded onto polystyrene-divinyl benzene support coated with an epichlorohydrin-glycidol copolymer. Mobile phase: 20 mM MES, pH 6. Flow Rate: 1 ml/min. Column: 4.6×50 mm. Injection: 20 μL at 1 mg/ml concentration, total volume injected varying from 20 μL to 400 μL.

A) NaCl in 50 mM Na-phosphate buffer, pH 7
B) $(NH_4)_2SO_4$ in 50 mM Na-phosphate buffer, pH 7

Figure 11:
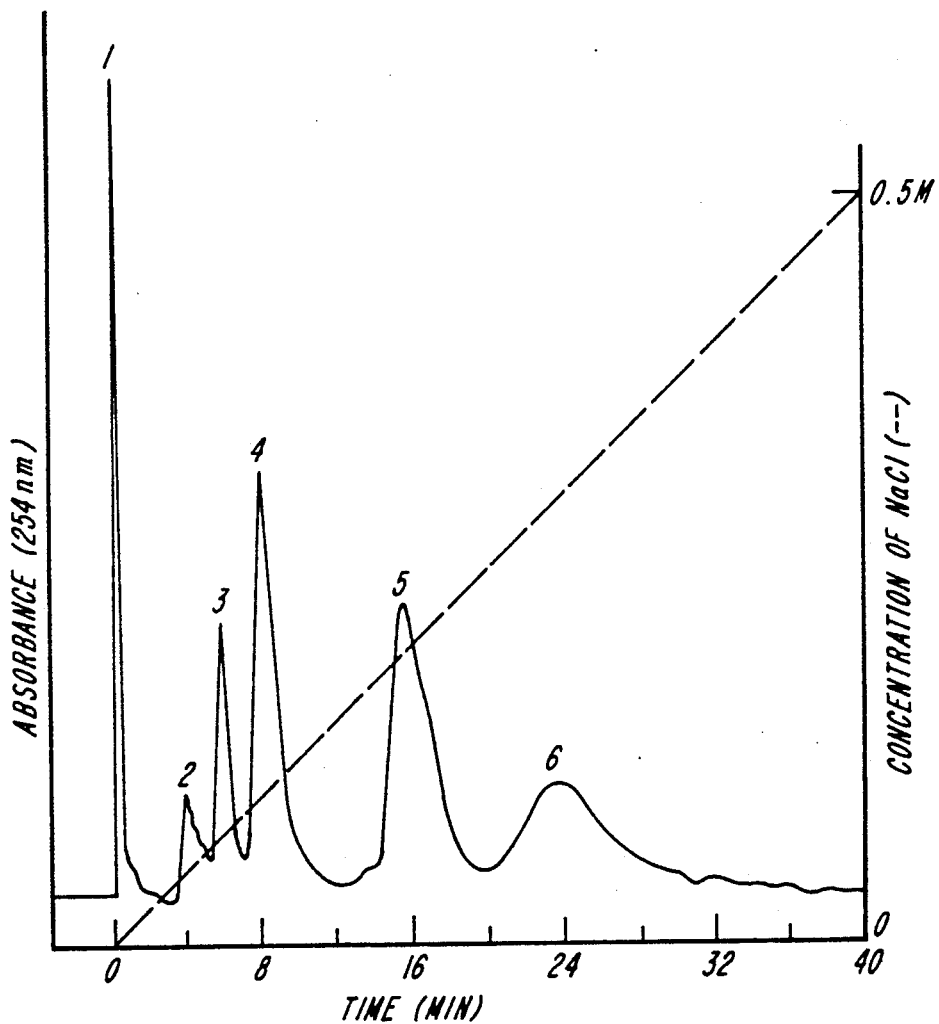

FIG. 11 is a chromatogram of the separation of six proteins on a weak-cation exchange packing produced by permanganate-periodate oxidation of hydrophilic coated polystyrene-divinyl benzene as shown in Example 3. Column: 5×0.41 cm I.D. (1000 Å, 15-25 μm). Mobile phase: A: 0.02M tris and 0.02M citric acid buffer (pH 5.8); B: A+0.5M NaCl. Flow rate: 1.0 ml/min; gradient from 0 to 100% B in 20 min. Column back pressure: 10 atm. Detection: UV 254 nm. Peak identification: 1: ovalbumin; 2: impurity from myoglobin; 3: myoglobin; 4: α-chymotrypsinogen A; 5: lysozyme; and 6: impurity from lysozyme.

Figure 12:
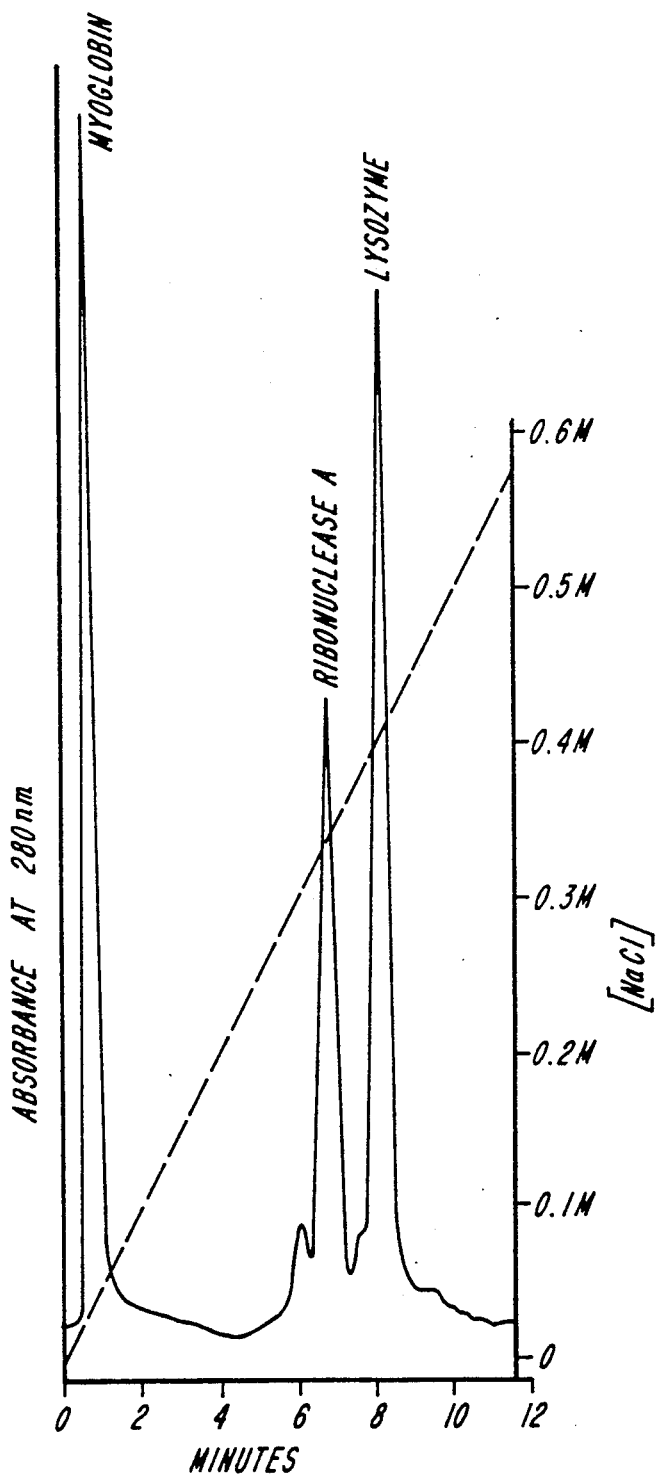

FIG. 12 is a chromatogram illustrating the separation of standard proteins on a weak cation-exchanger made by the method described in Example 4. Mobile phase: A: 0.05M phosphate buffer, pH 7; B: A+1M NaCl. Flow rate: 1 ml/min, gradient from 0 to 100% B in 20 min. Column: 4.6×50 mm. Flow rate: 1 ml/min. Injection volume: 25 μL.

DESCRIPTION

The invention provides a process in which molecules defining both hydrophobic and hydrophilic domains or segments are adsorbed by hydrophobic-hydrophobic interaction onto the surface of a hydrophobic support, and then are cross-linked in place to produce a permanent hydrophilic film. The resulting composite is inert, hydrophilic, and water wettable. In many cases, both the hydrophobic support material and the coating compound used as a starting material individually are sufficiently hydrophobic such that they are non-water wettable and water insoluble, respectively, yet the resulting pellicular support is both hydrophilic and water wettable. This seemingly incongruous result is achieved by exploiting the microstructure and steric properties of certain polymers, or polymerizable materials, so as to produce pellicular materials in which the hydrophobic regions of the adsorbed species and the hydrophobic surface of the underlying support are buried beneath an exposed continuous carpet of hydrophilic moieties. This approach permits complete or partial masking of hydrophobic regions within the adsorbed coating and on the substrate surface. Aqueous solutions therefore uniformly wet the surface of the material, and hydrophobic patches on proteins in solution need not be subjected to the potentially destructive effects of hydrophobic-hydrophobic interaction.

This type of coating can be produced on essentially any hydrophobic surface by exposing the surface to a true solution, hydrophilic with respect to the surface to be coated, comprising a solute having two critical chemical properties. First, the solute must comprise regions or domains having significant hydrophobic character, and, interconnected flexibly by covalent bonds, regions or domains having significant hydrophilic character. Second, the solute must comprise reactive moieties to serve as sites for subsequent crosslinking.

Figure 2A:
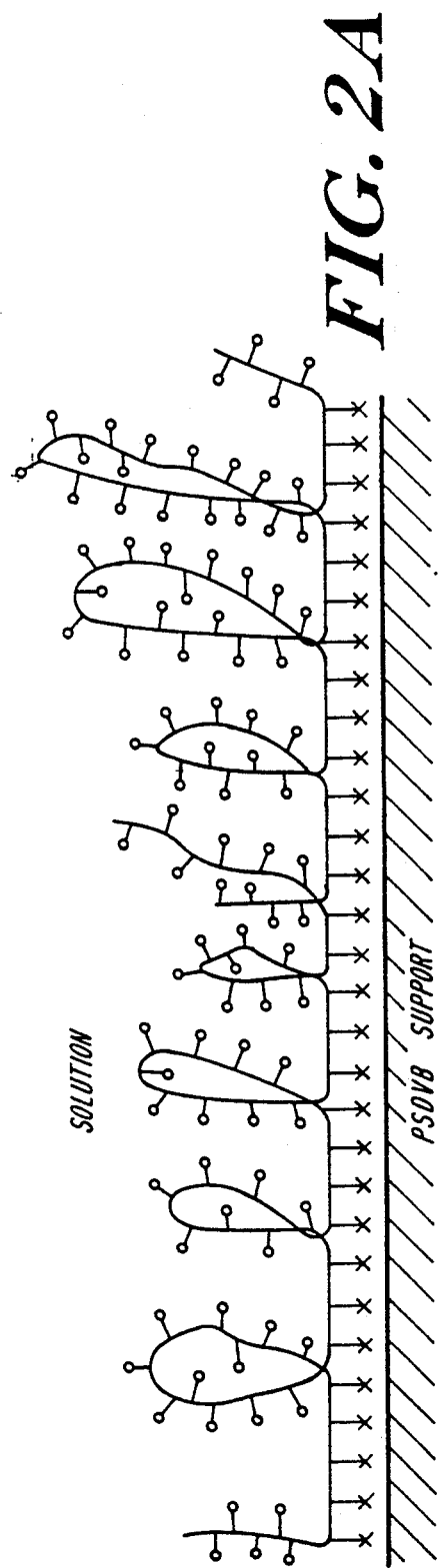
FIGS. 2A, 2B, and 2C illustrate the conformation of multidomain moieties disposed in solution in the presence of a hydrophobic support. Note the mutual repulsion of charged groups (open circles) in various polymers in low ionic strength solutions, and the association of hydrophobic domains (characterized by hydrophobic moities represented by X) with the hydrophobic surface.
Figure 2B:
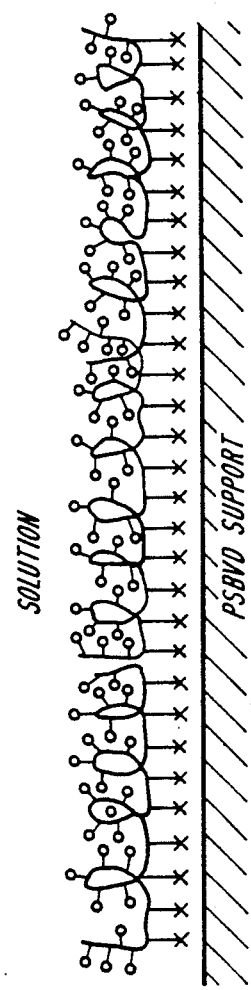
Figure 2C:

FIG. 2 schematically depicts the stereochemistry of a hydrophobic surface exposed to such a solute, represented by way of example as a polymer made up of plural regions or blocks comprising hydrophobic side groups (represented by X) and plural regions or blocks having hydrophilic side groups (represented by open circles). As illustrated, solute will adsorb at the hydrophobic surface by hydrophobic/hydrophobic interaction. The rate of adsorption will be proportional to solute concentration. Provided there is available in the solution an amount of solute sufficient to cover the available surface of the support, all exposed surfaces of the hydrophobic support material will be coated with a uniform layer of hydrophobic moieties. The hydrophilic portions of the solute will extend outwardly into the solution away from the hydrophobic regions. Depending on the molecular dimensions and relative amounts of hydrophilic and hydrophobic moieties in the solute, the adsorbed coating may present only hydrophilic moieties, effectively masking the hydrophobic regions, as illustrated in FIG. 2B, may continue to present significant hydrophobic areas as illustrated in FIG. 2C, or may result in a surface having small but accessible hydrophobic patches within a hydrophilic "forest" as illustrated in FIG. 2A.

The next production step is to cross-link in situ adjacent molecules adsorbed on the hydrophobic surface, thereby covalently linking the adsorbed species together. This crosslinking, in combination with the hydrophobic interaction, results in surface adherent pellicular coatings resistant to solvents and extremes of pH. These materials may be designed to have a uniformly hydrophilic surface, in which case they serve well as surfaces for use in vessels and pipes intended to contain protein solutions. They also may be used as a chromatography medium, for example, in size exclusion applications. Materials having residual exposed hydrophobic regions may be used in hydrophobic interaction chromatography.

If, after crosslinking, the adsorbed species has remaining exposed reactive sites, the coating may be derivatized at those sites using conventional procedures and chemistries, or the novel approaches disclosed herein. Using this approach, one may produce anionic or cationic exchange resins, as well as specialty resins useful, for example, in affinity chromatography, size exclusion chromatography, or neutral hydrophobic interaction chromatography.

While the resulting coatings are useful in the chromatographic separation of many types of mixtures, they are particularly well suited for the separation of proteins, and most particularly in the separation of such mixtures using high pressure, high throughput chromatography procedures. During storage and shipment, the media is stable, and the surface coating is disposed in the collapsed structure shown in FIG. 1B. When equilibrated with a hydrophilic solution, the surface is converted to the distended or swollen structure illustrated in FIG. 1A.

In its narrower aspects, the coating process of the invention may be broken down into four steps:

1. provision of a compound containing domains with hydrophobic and hydrophilic functional groups;
2. adsorption involving the deposition of hydrophobic domains onto the surface of a hydrophobic material and interfacial orientation of the hydrophobic and hydrophilic domains based on polarity;
3. a cross-linking step in which adjacent adsorbed species are linked together to produce a continuous film, and
4. an optional derivatization step.

The order of these steps is immaterial, except that crosslinking must occur after adsorption. Two or more steps may be conducted simultaneously.

Further particulars concerning each step of the process are described below.

The Substrate Materials

The invention may be practiced using essentially any hydrophobic substrate material, either organic or inorganic. Relatively inert hydrophobic polymeric materials are preferred. Rigid, cross-linked, high surface area particulate polymeric substrates are most preferred. The invention may be used to coat such substrate materials irrespective of their geometry. Thus, it may be used to line the surfaces of pipes and containers, coat all accessible surface areas of a membrane, or coat all surfaces of microparticulate porous polymeric materials.

The currently most preferred substrate material, for use in chromatography applications, is polystyrene most preferably crosslinked with divinyl benzene (PSDVB). Other crosslinkers known to the polymer chemist may be used. Furthermore, other types of resins may be used including polyethers, polysulfones, polyamides, polyimides, poly(arylene oxide), polyurethanes, polycarbonates, polyesters, poly(vinyl halides), poly(vinylidene halides), poly acrylates, polyolefins, derivatives, blends, copolymers, or multipolymers thereof.

Generally, best results are achieved with high surface area particles, e.g., those made by fusion of smaller particles produced in known emulsion or suspension polymerization techniques. Preferred specific PSDVB substrate materials are available from PL Laboratories, Ltd. of Shropshire, U.K.

The Adsorbing Species

The adsorbing species applied to the hydrophobic substrate may vary widely. An essential characteristic of materials useful in the coating Process is that they have short, interdispersed, hydrophilic and hydrophobic domains. Useful materials preferably comprise plural hydrophobic domains which are more hydrophobic than the nonpolar domains of most surfactants, are therefore more tightly adsorbed to hydrophobic surfaces than surfactants, and less likely to be leached from hydrophobic supports.

Hydrophobic segments of such multidomain materials will adsorb from a polar solution onto a hydrophobic surface. The driving force for adsorption is the thermodynamic minimization of the hydrophobic contact area between the hydrophobic surface and the relatively polar solvent medium. Adsorption is favored thermodynamically as the polar/nonpolar contact area is minimized. In contrast, there is no driving force for adsorption of polar segments of the polymer. Polymers containing relatively hydrophilic monomers such as $-(CH_2CH_2O)-$, $-(CH_2CHOHCH_2O)-$, $-(CH_2CHOH)-$, or $-(CH_2CH(CH_2OH)O)-$ are only weakly adsorbed at hydrophobic surfaces, if they are retained at all. When a segment containing these groups is located between two adsorbable hydrophobic segments, the hydrophilic segments loop out away from the surfaces as shown in the drawing. The size of the loop is dependent on the size of the hydrophilic segment. The conformation of the polymer at the surface after adsorption is that of a loop and train arrangement depicted schematically in FIG. 2. Because the hydrophilic loops imbibe water, the water content, surface hydrophilicity, and water wettability of the coated support are increased greatly and the potential hydrophobic contact area of the support is decreased greatly.

Figure 1A:
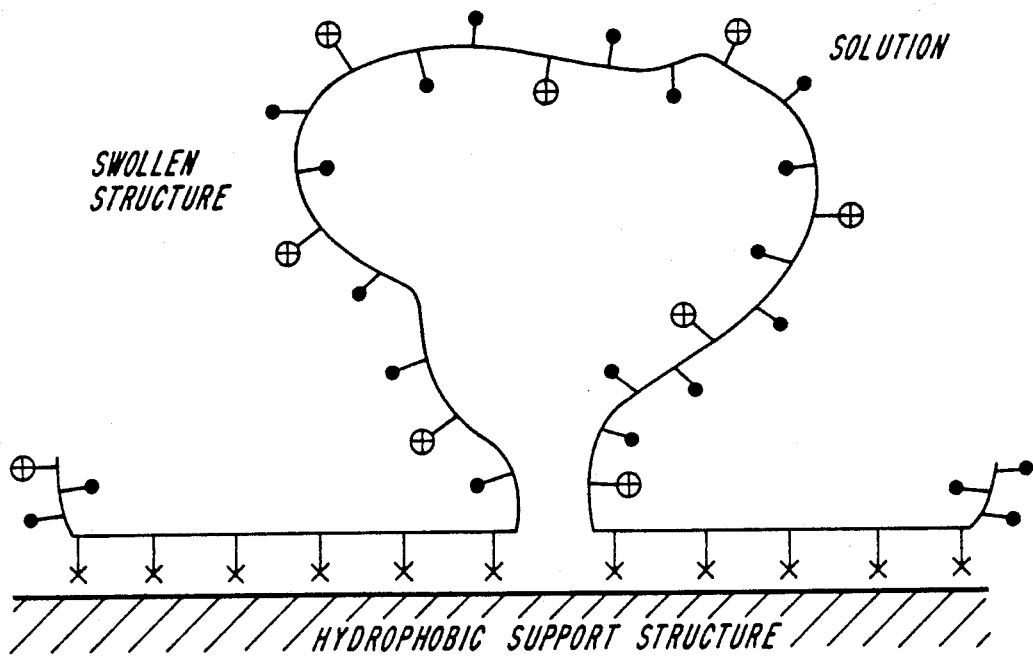
FIGS. 1A and 1B are schematic illustrations of a polymer in contact with a hydrophobic surface in a hydrophilic solution (A) and a hydrophobic solution (B), wherein X represents a hydrophobic moiety, the plus signs represent cationic groups, and the colored circles represent hydroxyl groups
Figure 1B:
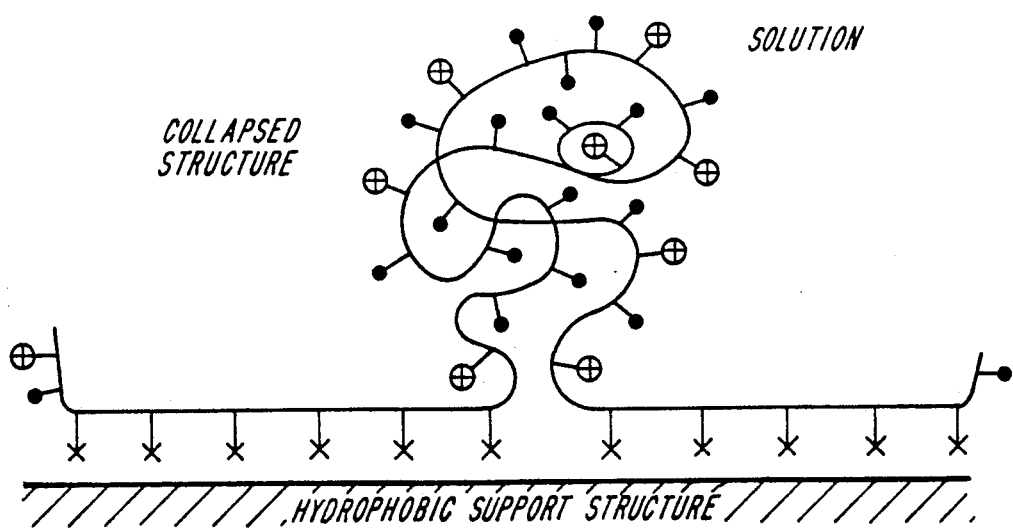

The surface characteristics of the coated support described above are related to the size of the hydrophilic loop. Hydrophilic loop size determines two additional characteristics of the coating: 1) the propensity of the coating to swell in very polar solvents at low ionic strength (as illustrated in FIG. 1A), and 2) the ability of polar groups in the hydrophilic loop to mask the hydrophobic character of the underlying support matrix, as illustrated in FIGS. 2A and 2B.

Studies of the pressure drop across columns packed with PSDVB particles coated as disclosed herein with polymers that produce large hydrophilic loops demonstrate that such polymers are very sensitive to the concentration of salt and organic solvent in the mobile phase, particularly when the coating polymer has been derivatized with ionic groups. Mutual repulsion of charged groups at low ionic strength can cause substantial expansion of the large loops. This is a common characteristic of soft-gel materials and is illustrated on a PSDVB support in FIGS. 2A and 2B. As illustrated, extensive swelling of the coating is difficult for adsorbed species with short interdispersed segments.

The second characteristic of large hydrophilic loops is that they can extend so far away from the surface that they do not cover hydrophobic portions of the surface. This behavior potentially allows small proteins with a hydrophobic exterior, such as a lysozyme, to adsorb at embedded but exposed hydrophobic patches at the surface of the coated support.

The ratio of hydrophilic and hydrophobic monomers can control the swelling and the coating efficiency of the polymer. If the hydrophilic:hydrophobic monomer ratio is too high, the polymer will produce large loops when in contact with the hydrophobic surface. This causes swelling and poor surface coverage. If the hydrophilic:hydrophobic monomer ratio is too low, the polymer will be insoluble in relatively hydrophilic solvents.

Currently preferred adsorbed species include copolymers, terpolymers, or multipolymers, preferably comprising blocks of like monomers which constitute the hydrophobic and hydrophilic domains, and also comprising plural reactive groups suitable for crosslinking and optional derivatization. Best results so far have been achieved with acrylic and polyether chemistries to produce species such as epichlorohydrin-glycidol copolymer, and polyacrylic acid-glycidyl ester copolymer. Oligomeric materials may also be used, and after crosslinking generally have equivalent properties to larger species of equivalent monomer composition. Oligomeric materials may be preferred because of their ease of solubility. Species which are not polymeric or oligomeric, but which may be polymerized and/or crosslinked on the hydrophobic surface also may be used. Examples include compounds comprising a hydrophobic core region consisting of a hydrocarbon chain or halogenated hydrocarbon chain flanked by hydrophilic, reactive groups constituting hydrophilic domains. When adsorbed at the hydrophobic substrate surface, these types of materials can be crosslinked in place to produce a uniform, pH insensitive, pellicular coating which presents a swellable hydrophilic surface having the properties described above. A specific example of such a material is a lower alkyl diglycidyl ether, which may be crosslinked and polymerized using, for example, boron trifluoride.

Adsorption

Best results are achieved by adsorbing the multidomain species onto the hydrophobic substrate from a true solution. In accordance with an aspect of the invention, a solvent is selected which has a hydrophilic/lipophilic balance just sufficiently hydrophobic to permit solubilization of the coating compound with its hydrophobic domains. In such solvents, the compound will be only sparingly soluble. This approach promotes adsorption as it maximizes the tendency of the hydrophobic domains to partition onto the hydrophobic surface while simultaneously solubilizing the hydrophilic domains. Aqueous solvents are preferred. To achieve solubilization of the coating compound, various amounts of water-miscible organic solvents may be added to the water. Examples include polyethylene glycol, propanol, methanol, acetonitrile, and acetone. The currently preferred solvent system is water/polyethylene glycol/propanol. These compounds are miscible with water in all proportions. Such mixed solvent systems can optimize the adsorption step. However, the only requirement for adsorption is that the solvent be hydrophilic with respect to the surface (less hydrophobic than the surface), and capable of dissolving the coating compound.

Cross Linking

Generally the cross linking step is conducted using chemical reactions and processing techniques known to those skilled in the art to produce true covalent bonds between adjacent molecules. Details of crosslinking reactions necessarily depend on the nature and selection of the adsorbed species. The crosslinking reactions may be conducted so as to produce a relatively low crosslink density so that surface groups remain for use in derivatizing the coating. Currently preferred crosslinking approaches include boron trifluoride catalyzed reaction of epoxide groups to produce an ether crosslink and a pendent hydroxyl group; the reaction of a halide group with a hydroxyl group conducted in strong base to produce an ether crosslink (Williamson Ether Synthesis); and the reaction of a divinyl or other multiply unsaturated compound with acrylates, methacrylates, or other unsaturated pendent groups.

Derivatization

Optionally the pellicular coating of the invention may be derivatized to produce various types of chromatography media useful in size exclusion, hydrophobic interaction, metal chelate, strong or weak anionic exchange, strong or weak cation exchange, or affinity chromatographies. Groups useful in these various types of separation typically are attached through pendant hydroxide, halide, or epoxide moieties accessible on the crosslinked pellicular coating using chemistries well known to those skilled in the art and employed to derivatize other types of polymeric substrates. As non limiting examples, chloride or bromide groups on the coating may be treated with: 1) polyethers of various lengths to produce swellable hydrophilic tentacles extending from the substrate's surface; 2) alkanols to produce ether linked hydrocarbons of various lengths ranging, for example, from $C_4$ to $C_{20}$; 3) polyethylenimine to produce a cationic resin (anion exchanger) which itself may be derivatized further; 4) tertiary amines, (e.g., $:N(CH_3)_2$) to produce strong anionic exchange resins; 5) diethanol amine to produce weak anionic exchange resins; 6) alpha hydroxy alkyl sulfonates to produce strong cationic exchange resins; 7) hydroxyacetic acid to produce a weak cationic exchange resin; 8) imino-diacetic acid to produce a metal chelate resin; and 9) various combinations of the foregoing. Hydroxyl or epoxy groups can be derivatized similarly. Antibodies and other binding proteins may be immunochemically, electrostatically, or covalently coupled to the coatings using procedures known per se.

The invention will be understood further from the following non limiting examples.

EXAMPLE 1

This coating process is based on the two epoxy monomers, epicholorohydrin and glycidol. The monomers are polymerized with boron trifluoride to give an epoxy polymer that is relatively hydrophobic.

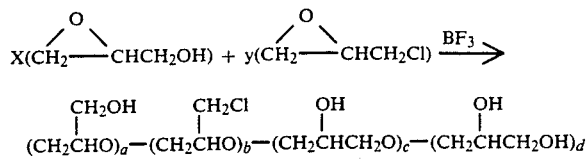

BF₃ polymerization of epoxies also forms cyclic polymers in addition to the linear polymer illustrated in the formula. By varying the monomer ratio, i.e., the x/y ratio, one may vary the hydrophobicity of the linear or cyclic epoxy polymer. In this example, ratios ranging from 0.5 to 10 are used. Copolymers of x/y ratios ranging from 0.5 to 3 have poor water solubility. The copolymer is dispersed in water containing polyethylene glycol/propanol and then mixed with divinyl benzene crosslinked polystyrene chromatography beads sold by PL Laboratories, Shropshire, U.K.

More specifically, "Y" ml epichlorohydrin and "X" ml glycidol are dissolved in 15 ml dicholoromethane. $X+Y$ is kept constant at 2 ml and (X:Y) ratio is varied between 0.5 and 5. The preferred ratio is 0.5. After dissolving the monomers, 50 μL boron trifluoride is added to the mixture. The polymerization reaction is conducted at room temperature for a period of 24 hours after which the solvent is evaporated. The remaining viscous polymer is dissolved in a mixed solvent comprising 10 ml water, 7 ml polyethylene glycol, and 30 ml isopropanol. The solution is filtered and 3 grams of polystyrene divinylbenzene particles are added. The resulting suspension is briefly sonicated and then agitated for 14 hours.

The epoxy polymer is adsorbed onto the hydrophobic surface. The hydrophobic —CH₂Cl groups orient toward the PSDVB surface while the hydrophilic —CH₂OH groups orient outward toward the solution where it is solvated, as shown below.

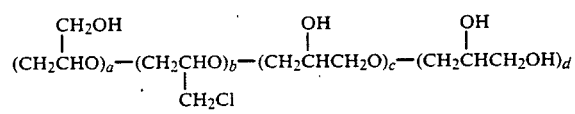

The most satisfactory coatings were obtained with x/y ratios less than 3. Ratios of 5-10 were less satisfactory. When 5-10 hydroxyl groups appear in a row, these hydrophilic segments seem to loop out away from the surface.

The next step of the coating process involves crosslinking by ether bond formation in strong base according to the reactions:

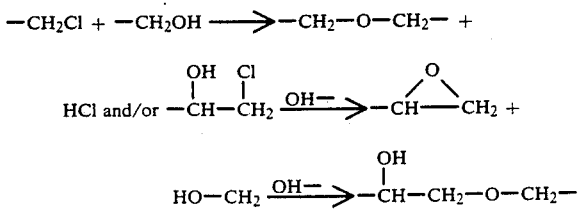

Reaction time determines the amount of —CH₂Cl consumed in the reaction. The reaction may be stopped before all —CH₂Cl is consumed to leave both —OH and —Cl groups in the coating so that additional groups can be attached through either of these functional groups.

More particularly, the particles are filtered and washed with 50 ml water. The wetted particles are then suspended in 50 ml, 3M KOH, sonicated briefly, and agitated at room temperature for 24 hours. The particles are then filtered and washed sequentially with water, isopropanol, and acetone, and then dried for 3 hours under vacuum at 60° C.

The resulting particles are easily suspended. FIG. 3 shows peak height vs. injection number (cumulative volume of sample) for lysozyme. Note that peak height does not change significantly over the series of injections, indicating the absence of hydrophobic patches on the surface of the medium.

The hydrophilic coating may be derivatized with a stationary phase ligand using techniques known in the art, as set forth below.

Derivatization

Figure 4:
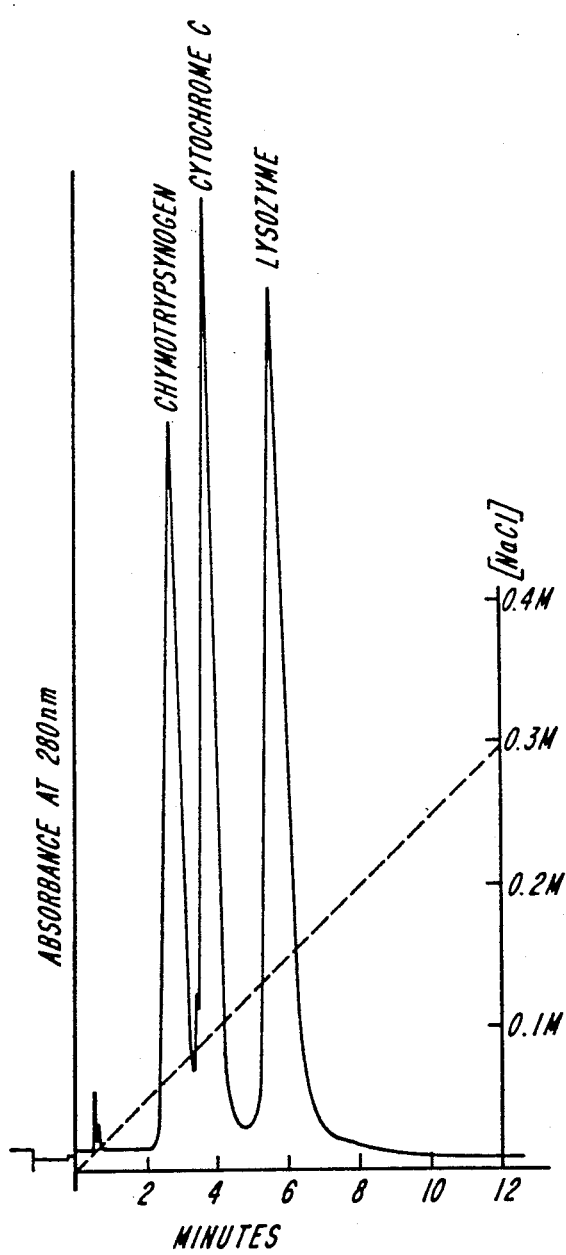
FIG. 4 shows the separation of test proteins on the strong cation-exchanger made by the method described in Example 1A. Mobile phase: A: 20 mM MES, pH 6; B: A+0.5M NaCl. Gradient: from 0 to 100% B in 20 minutes. Column: 4.6×50 mm. Flow rate: 1 ml/min. Injection volume: 20 μL.

A) A strong cation-exchanger may be produced by suspending 1 gram of coated material in 8 ml, 3M KOH containing 3 grams of hydroxy ethane sulfonic acid for 14 hours at 80° C., after which it is filtered and washed with water, followed by isopropanol. The particles are then suspended in 8 ml, 3M KOH containing 3 grams of bromoethane sulfonic acid for 14 hours at 80° C. The solution is filtered and washed with water, isopropanol, and acetone and then air dried. FIG. 4 shows an exemplary chromatographic separation of a protein test mix using this derivatized material.

Figure 5:
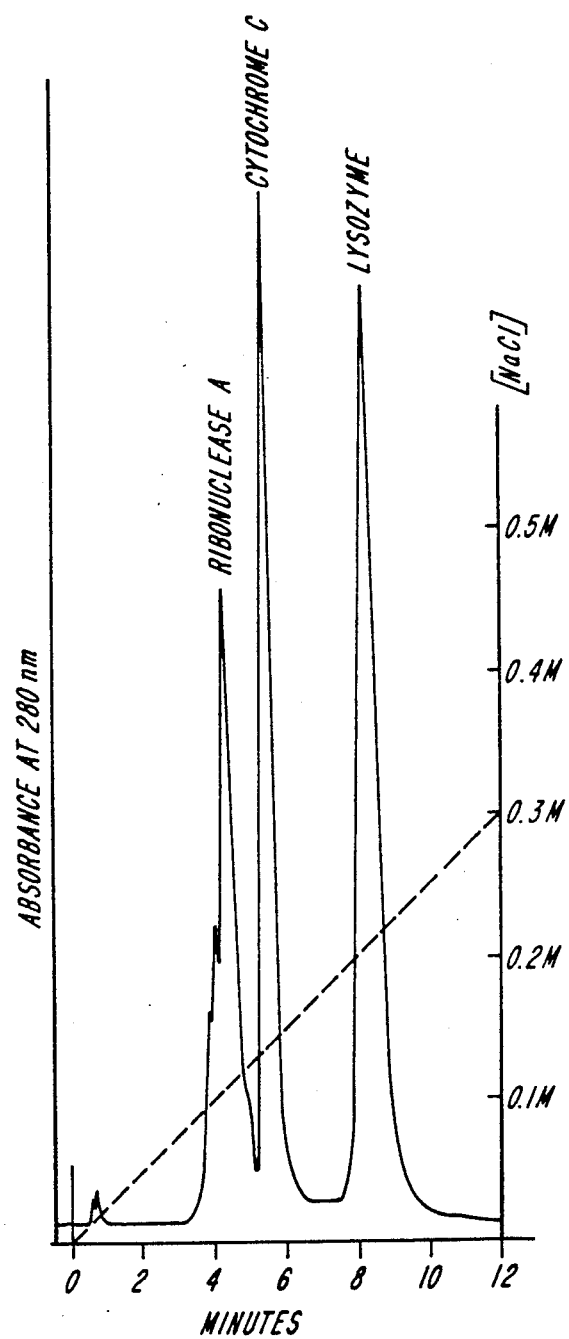
FIG. 5 shows the separation of test proteins on the strong cation-exchanger made by the method described in Example 1B. Mobile phase: A: 20 mM MES, pH 6; B: A+0.5M NaCl. Gradient: from 0 to 100% B in 20 minutes. Column: 4.6×50 mm. Flow rate: 1 ml/min. Injection volume: 20 μL.

B) Another strong cation-exchanger may be produced by suspending 1 gram of coated material in 30 ml dry dichloromethane containing 1 ml phosphorus tribromide. This solution is refluxed for 14 hours after which it is filtered and then washed with dichloromethane, followed by acetone, and then air dried. The dry particles are then suspended in 3M KOH containing 3 grams of hydroxyethane sulfonic acid for 14 hours at 80° C. The solution is then filtered and washed with water, isopropanol, and acetone, and then air dried. FIG. 5 shows the results of a chromatographic separation of a standard protein mix on this strong cation-exchanger.

Figure 6:
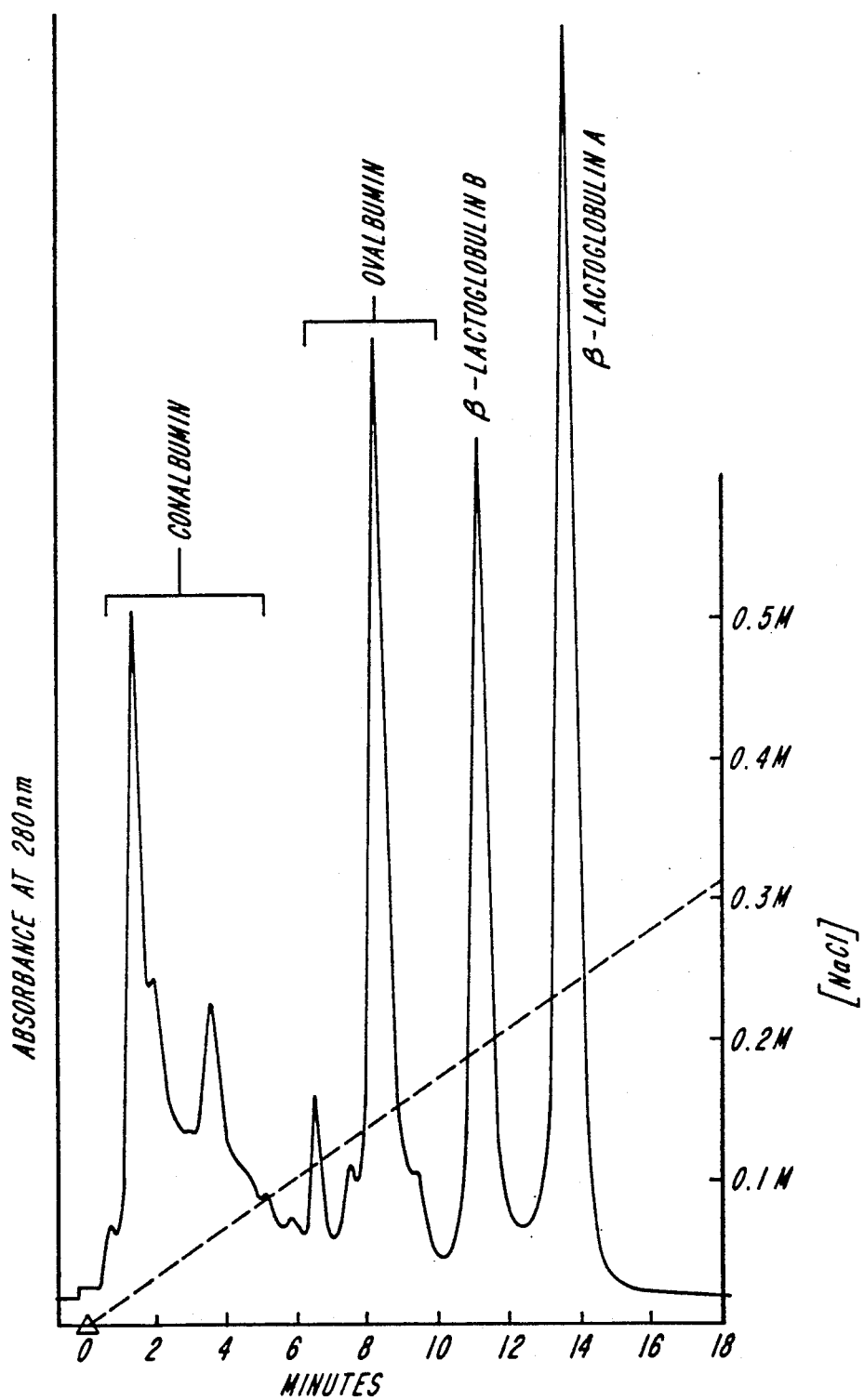
FIG. 6 shows the separation of test proteins on the strong anion-exchanger made by the method described in Example 1C. Mobile phase: A: 20 mM Piperazine, pH 6; B: A+0.35M NaCl. Gradient: from 0 to 100% B in 20 minutes. Column: 4.6×50 mm. Flow rate: 1 ml/min. Injection volume: 20 μL.

C) A strong anion-exchanger may be produced by suspending 1 gram of brominated particles in 30 ml of 10%(v/v) dimethylethanolamine in methanol and refluxed for 14 hours. The particles are then filtered and washed sequentially with methanol, water, methanol, and finally acetone, and then air dried. FIG. 6 shows the chromatographic separation of a standard protein mix on this strong anion-exchanger.

Figure 7:
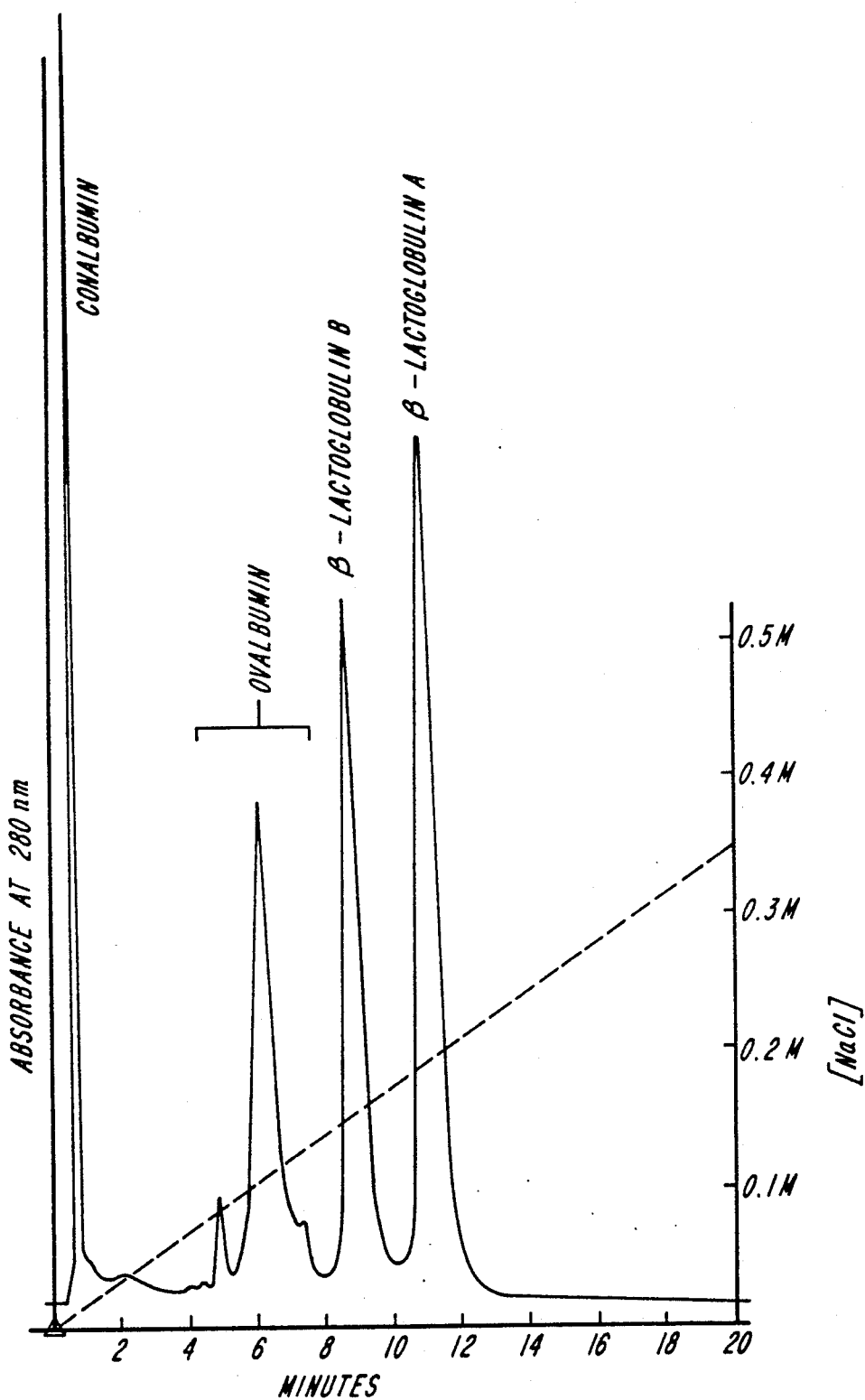
FIG. 7 shows the separation of test proteins on the strong anion-exchanger made by the method described in Example 1D. Mobile phase: A: 20 mM Piperazine, pH 6; B: A+0.35M NaCl. Gradient: from 0 to 100% B in 20 minutes. Column: 4.6×50 mm. Flow rate: 1 ml/min. Injection volume: 20 μL.

D) Another method of producing a strong anion-exchanger entails suspending 1 gram of brominated material in 30 ml methanol containing 10%(w/v) polyethylenamine. This solution is refluxed for 14 hours after which it is filtered and washed sequentially with methanol, water, 0.1N NaOH, water, and methanol. The particles are then suspended in a mixture of 8 ml dimethyl formamide, containing 1 ml methyl iodide, and 500 μL pentamethyl piperidine for 14 hours at 60° C. The solution is then filtered and washed sequentially with dimethylformamide, methanol, and acetone, and then air dried. FIG. 7 shows the results of a chromatographic separation using this strong anion-exchanger.

EXAMPLE 2

Dodecylpolyglycidol ether surfactant is produced by dissolving 2.5 ml of dodecanol (Aldrich, Milwaukee Wis.) in 2.5 ml of methylene chloride. A few drops of boron trifluoride-etherate (Aldrich) are added and then 2.5 ml of glycidol (Aldrich) is slowly added to the reaction mixture over a period of about 1½ to 3 days. During this time the mixture is continuously stirred with a RH-SY Synchronous Lab Pump (Fluid Metering Inc., Oyster Bay, N.Y.). Slow addition of the glycidol increases its chance of reacting with dodecanol rather than with itself. As the reaction proceeds, an immiscible, viscous residue forms.

After the addition of glycidol is complete, the methylene chloride solution is poured into a centrifuge tube and the remaining viscous residue is extracted 3 to 4 times with methylene chloride. The cloudy methylene chloride wash solutions are pooled in the centrifuge tube with the original reaction mixture and spun at 1000 G for approximately 20 minutes. This produces a clear bottom layer of methylene chloride solution and a shallow top layer of a viscous syrup. The top layer is discarded and the methylene chloride is evaporated to yield another viscous residue which is then extracted 3-4 times with diethyl ether to remove hydrophobic components. The clear, colorless surfactant product remaining after the diethyl ether extraction is dried under a vacuum to remove any additional solvent. This procedure yields about 1.5 g of product. The amount of product can be varied by proportionally adjusting the amount of reactant, solvent, and time.

Crosslinkable moieties are bound to the surfactant by reaction with epichlorohydrin. A typical modification is achieved by adding 1.0 ml epichlorohydrin (Eastman, Rochester, N.Y.) to 1.0 g surfactant in 16 ml of methylene chloride. This yields a cloudy solution. A few drops of boron trifluoride-etherate are added and the reaction mixture is shaken for 24 hours, during which time the mixture becomes clear. The methylene chloride is then evaporated and the remaining viscous residue is extracted 3 or 4 times with diethyl ether to remove polymerized epichlorohydrin. This leaves about 0.5 g of epichlorohydrin-modified surfactant. It is important to note here that overderivatizion with epichlorohydrin may result in modified surfactant which is completely soluble in diethyl ether.

The epichlorohydrin-modified surfactant is coated onto poly(styrene-divinylbenzene) HPLC packing in an isopropanol/water solution. A typical procedure for coating 2.2 g of packing begins by dissolving about 2.2 g modified surfactant in 30 ml isopropanol. Water is added slowly until the surfactant solution becomes cloudy (around 29 mL water). Enough isopropanol is then added (less than a ml) to yield a clear solution. The particulate PSDVB is dispersed in this solution and allowed to sit overnight with stirring. This is followed by isolation of the particulate packing by filtration and washing with 50–75 ml of water. The coating is then cross-linked by adding the coated particles to 50 ml of an aqueous 3M NaOH solution. The crosslinking reaction proceeds for 24 hours. The crosslinking reaction mixture may be heated briefly to near boiling point prior to filtering and washing; however, this step does not seem to be necessary to achieve adequate crosslinking. The packing is then isolated by filtration and washed with water and 100 ml each of 75/25, 50/50, 25/75 and 0/100 mixtures of water/isopropanol.

Figure 8:
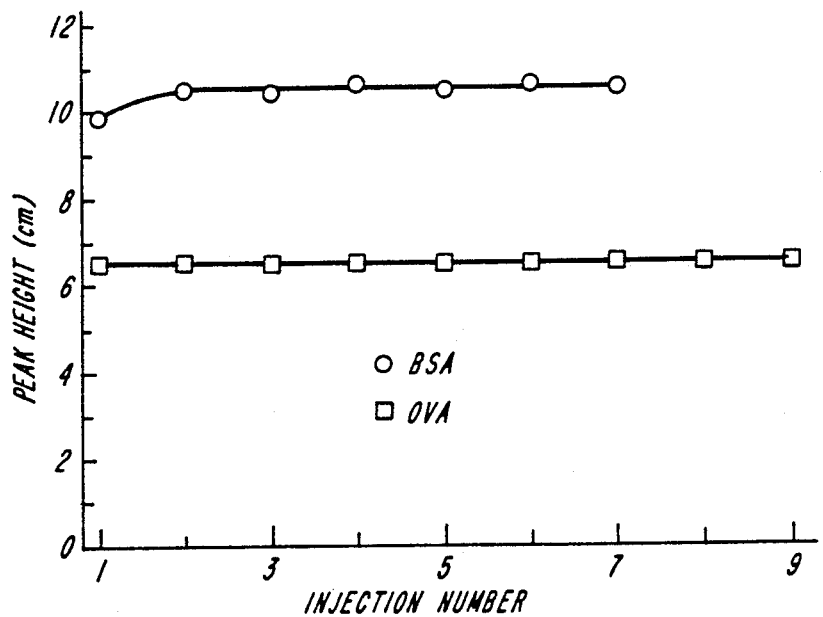
FIG. 8 shows the peak height vs. injection number for bovine serum albumin (BSA) and ovalbumin (OVA) on a column packed with dodecyl-polyglycidol ether-coated polystyrene beads. Mobile phase: 0.05M phosphate buffer, pH 6.8. Column: 4.6×50 mm. Flow rate: 1 ml/min. Injection volume: 20 μL at 4 mg/ml concentration.
Figure 9A:
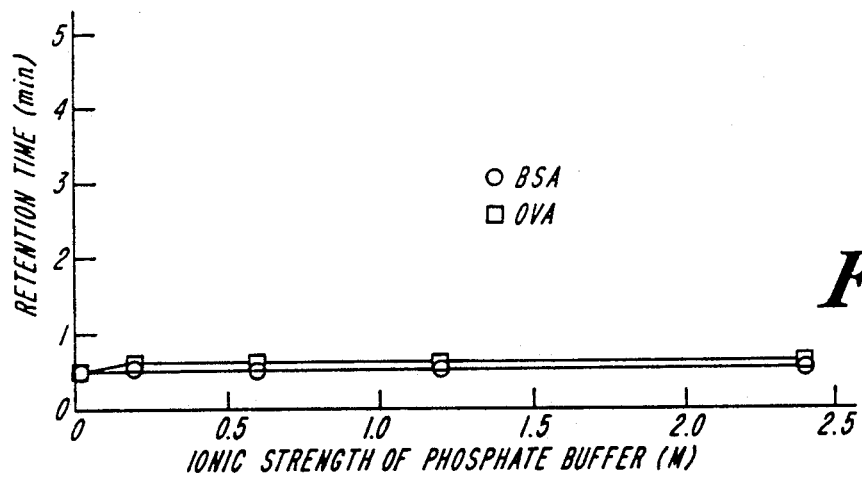
FIGS. 9A and 9B are graphs of retention time vs. ionic strength of a phosphate buffer for various proteins passed through a column packed with dodecyl-polyglycidol ether-coated polystyrene beads. Samples: ovalbumin (OVA), bovine serum albumin (BSA), lysozyme (LYSO), and cytochrome C (Cyto C). Mobile phase: phosphate buffer, pH 7. Column: 4.6×50 mm. Flow rate: 1 ml/min.
Figure 9B:
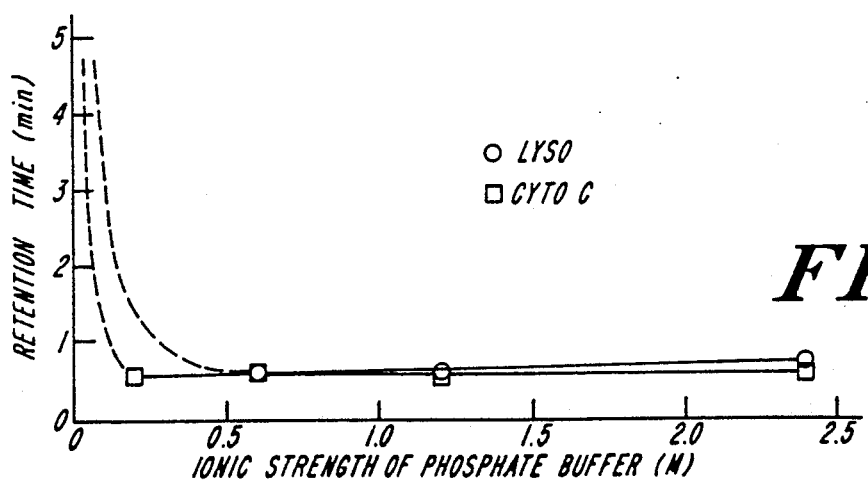

FIGS. 8 and 9 illustrate the surface properties of particles made in accordance with this example. FIG. 8 shows a constant peak height with increasing quantity of two proteins, illustrating that the medium has very low hydrophobic character. FIG. 9B shows that positively charged proteins bind well at low ionic strength, indicating that the medium is anionic. FIG. 9A shows that negatively charged proteins have low constant retention time irrespective of ionic strength, indicating the absence of significant positive charge.

EXAMPLE 3

450 mg of ethylene glycol diglycidyl ether (EDGE) is dissolved in 5 ml of diethyl ether and added to 1 g of macroporous PSDVB particles (10 μm particles, 1000 Å pores). The solvent is removed by evaporating the solution under vacuum. The product is a dry white powder.

The dry, EDGE coated sorbent is added to a fritted glass filter. 5 ml of boron trifluoride-etherate is added to a dry suction flask and the fritted glass containing the monomer coated sorbent is fitted to the top of the flask. Boron trifluoride-etherate vapors are gently swept upward through the sorbent by a stream of nitrogen introduced through the side arm on the filter flask. The crosslinking reaction is terminated after 4 hr by adding the sorbent to water. A 4 hour acidic (pH 1-2) aqueous wash hydrolyzes residual epoxy groups. The sorbent then is washed sequentially with methanol and acetone and dried under vacuum in a desiccator.

To increase the hydrophilic nature of the surface and increase the number of hydroxy groups, a glycidol treatment may be applied to a hydroxy-containing surface. This is accomplished by dispersing one gram of the material in 20 ml of methylene containing 2 ml of glycidol. While agitating the mixture in the reaction vessel, a small aliquot of $BF_3$-etherate is added to the suspension. After 2-3 minutes, clumps form, and after 15 minutes, the resin is washed sequentially with methanol and water.

To derivatize the coated resin particle, one gram of the resin is suspended in 10 ml water. Two grams of $NaIO_4$ and 30 mg $KMnO_4$ are dissolved in 40 ml water containing 0.5 g $K_2CO_3$. The suspension and the oxidant mixture are then washed sequentially with water, concentrated HCl, and water again, to neutral pH. An HCl-NaOH back titration is used to determine the pKa and the capacity of the ionic group. About 0.5 meq/g of carboxylic groups are produced by controlling the oxidation conditions.

Figure 10A:
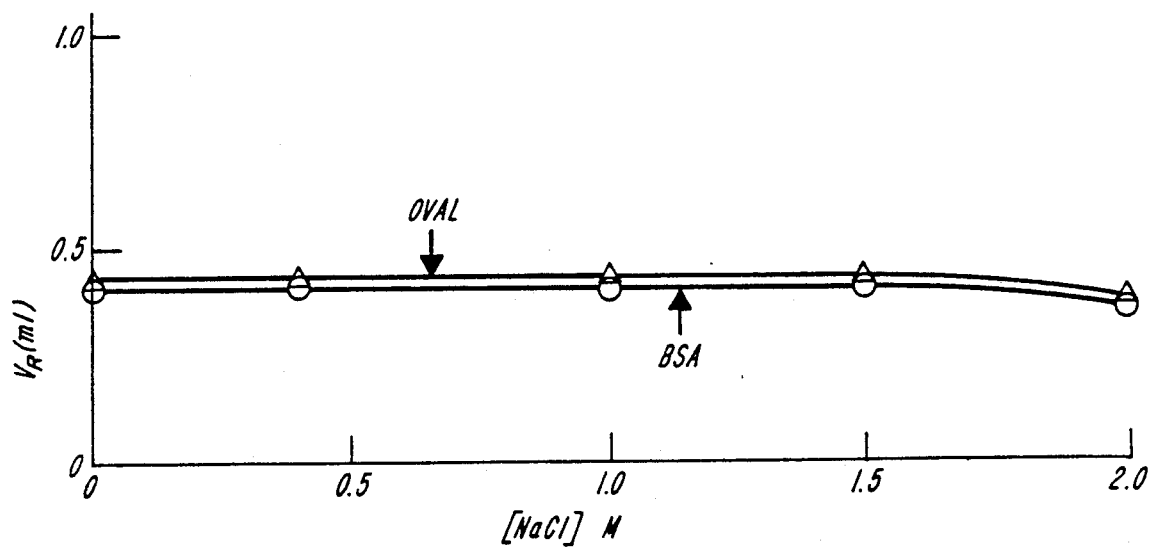
FIG. 10 is a graph of retention volume versus increasing salt concentration illustrating hydrophilicity of the coated resin made by the method described in Example 3. Column: 4.6×50 mm. Flow rate: 0.5 ml/min. Detection: UV 254 nm.
Figure 10B:
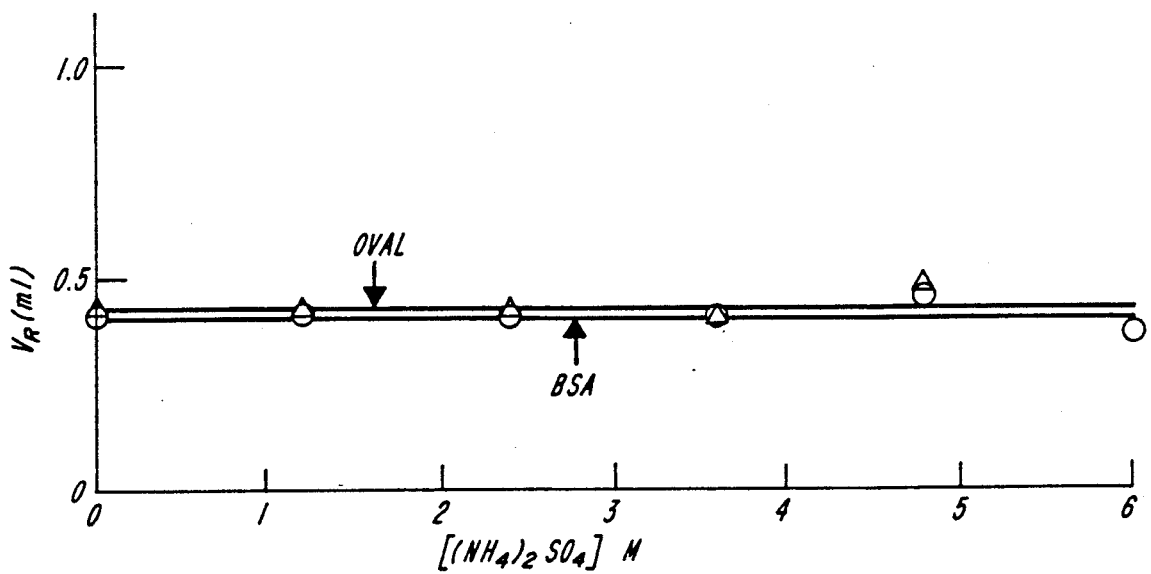

The hydrophilicity of the coated beads is demonstrated by the data set forth in FIG. 10. The chromatographic capabilities of the derivatized packing is illustrated in FIG. 11. FIG. 10A shows that retention volume for two negatively charged proteins is constant with increasing NaCl concentration up to 2.0M, illustrating the absence of Positive charge on the resin. FIG. 10B shows constant retention volume to 6M ammonium sulfate, demonstrating that no significant hydrophobic character remains on the surface of the medium.

EXAMPLE 4

To make a weak cation-exchanger on PSDVB, 6 ml $CH_2Cl_2$ (dried over 4 Å molecular sieves) is transferred into a 50 ml round-bottomed flask. 1 ml glycidyl methacrylate is added and gently swirled. A $BF_3$-etherate solution is made by adding 5 μL $BF_3$-etherate to 2 ml $CH_2Cl_2$ in a test tube. The $BF_3$-etherate solution is added to the glycidyl methacrylate solution drop by drop with swirling. The round-bottomed flask is wrapped with aluminum foil and shaken at room temperature for 24 hours. Next, 3 ml isopropanol and 3 ml water are added to the flask to stop the reaction. The solvent is removed under vacuum, and PEG and water are added to the solution of pre-polymer until a slightly cloudy solution is obtained (approximately 8 ml PEG and 8 ml of water). At this point, 1 gram of PSDVB particles is added to the pre-polymer solution. After sonicating for 5 min. and degassing, the system is shaken at 37° C. for 24 hours.

After filtering and washing three times with 50 ml $H_2O$, the pre-polymer coated PSDVB is transferred into a methacrylate acid solution (20 ml, 1.7% w/v), and 0.5 g ammonium persulfate is added. The reaction is conducted under $N_2$ flow with continuous stirring for 24 hours. 20 μl tetra methyl ethylene diamine is then added and the reaction continues for 30 more minutes. The reaction is quenched by the addition of 10 μl hydroquinone. After filtering and washing with water (3×30 ml), methanol (3×20 ml), and $CH_2Cl_2$ (50 ml), the particles are dried overnight under vacuum.

The chromatographic properties of this material are illustrated by the data set forth in FIG. 12.

The invention may be embodied in other specific forms without departing from the spirit and scope thereof. Other embodiments are within the following claims.

What is claimed is:

1. A method of producing a hydrophilic coating on a hydrophobic surface comprising the steps of:

contacting said hydrophobic surface with a liquid phase, hydrophilic with respect to said surface, containing a solvated compound, molecules of said solvated compound comprising a hydrophobic domain covalently and flexibly bonded to a hydrophilic domain, and a crosslinkable site, thereby to deposit molecules of said compound on said hydrophobic surface whereby said molecules of said compound are oriented with said hydrophobic domains proximate to and adsorbed on said hydrophobic surface and with said hydrophilic domains extending outwardly from said hydrophobic surface into said liquid phase; and crosslinking molecules adjacent one another at said crosslinkable sites to produce an adherent film on said surface.

2. The method of claim 1 wherein at least one of said domains comprises derivatizable moieties, the method comprising the additional step of derivatizing said adherent film.

3. The method of claim 1 wherein said compound is a polymer comprising plural hydrophobic domains said plural hydrophilic domains.

4. The method of claim 1 wherein the liquid phase is formulated such that said compound is sparingly soluble therein to promote partition of hydrophobic domains of said compound onto said hydrophobic surface.

5. The method of claim 1 wherein the crosslinking step is effected by reacting a subset of said hydrophobic domains.

6. The method of claim 1 wherein the crosslinking step is effected by reacting a subset of said hydrophilic domains.

7. The method of claim 1 wherein the molecules of said solvated compound have a hydrophilic domain of a molecular dimension sufficient to mask said hydrophobic surface.

8. The method of claim 1 wherein said hydrophilic domains comprise moieties comprising hydroxyl groups or ether linkages.

9. The method of claim 1 wherein the hydrophobic domains comprise moieties comprising halides or hydrocarbons.

10. The method of claim 1 wherein said compound comprises a multipolymer wherein said hydrophobic domains comprise plural linked hydrophobic monomers and said hydrophilic domains comprise plural linked hydrophilic monomers.

11. The method of claim 1 wherein said compound is a copolymer wherein blocks comprise said hydrophobic domain and said hydrophilic domain.

12. The method of claim 1 wherein said hydrophobic surface defines a chromatography matrix.

13. The method of claim 1 wherein said hydrophobic surface is an organic polymeric material stable from pH2 to pH12.

14. The method of claim 1 wherein said hydrophobic surface comprises polystyrene.

15. The method of claim 1 wherein said hydrophobic surface comprises divinylbenzene crosslinked polystyrene.

16. The method of claim 1 wherein said compound is a monomer, said method comprising the additional step of polymerizing said monomer in place on said surface.

17. The method of claim 1 wherein said hydrophilic domain contains epoxy groups and said crosslinking step is effected by reacting said epoxy groups on adjacent molecules.

18. The method of claim 1 wherein said crosslinking step is effected by reacting a halide group on one of said molecules with a hydroxyl group on another.

19. The method of claim 1 wherein said crosslinking step is effected by reacting a crosslinking compound comprising plural reactive groups with reactive groups on said molecules.

20. Hydrophilic material useful in contact with a protein solution to inhibit denaturation comprising a hydrophobic substrate and, adhered thereto by hydrophobic interaction, an enveloping, continuous film, the individual interaction an enveloping, continuous film, the individual molecules of said film comprising a hydrophobic domain covalently and flexibly bonded to a hydrophilic domain, and a crosslinkable site, wherein such molecules are adsorbed onto said surface by hydrophobic-hydrophobic interaction and said hydrophilic domain are disposed outwardly therefrom, said individual molecules being crosslinked at said crosslinkable site.

21. The material of claim 20 wherein said hydrophilic domains have a surface density within said film sufficient to mask said hydrophobic domains and said hydrophobic substrate.

22. The material of claim 20 wherein said hydrophobic substrate comprises an organic polymeric material.

23. The material of claim 20 wherein said hydrophobic substrate comprises polystyrene.

24. The material of claim 23 wherein said substrate comprises polystyrene crosslinked with divinylbenzene.

25. The material of claim 20 wherein said hydrophobic substrate comprises a member selected from the group consisting of a microparticulate chromatography medium and a microporous membrane.

26. The material of claim 20 further comprising moieties covalently linked to said film disposed outwardly from said surface selected from the group consisting of cationic groups, anionic groups, hydrocarbon groups, groups capable of metal chelation, binding proteins, and combinations thereof.

* * * * *

UNITED STATES PATENT AND TRADEMARK OFFICE
CERTIFICATE OF CORRECTION

PATENT NO. : 5,030,352
DATED : July 6, 1991
INVENTOR(S) : Varady et al.

It is certified that error appears in the above-identified patent and that said Letters Patent is hereby corrected as shown below:

In column 14, line 54, after "domains," the word reading "said" should read --and--.

In column 16, line 8, after "continuous film," the words "the individual interaction an enveloping continuous film," should be deleted.

Signed and Sealed this

Seventeenth Day of August, 1993

Attest:

BRUCE LEHMAN

Attesting Officer

Commissioner of Patents and Trademarks